Feb. 12, 1924.

W. W. PECK 1,483,373

SPEED CHANGE AND REVERSE GEARING

Filed March 5, 1923

W. W. Peck,
INVENTOR

BY Victor J. Evans
ATTORNEY

WITNESSES

Patented Feb. 12, 1924.

1,483,373

UNITED STATES PATENT OFFICE.

WILLIAM W. PECK, OF MUNCIE, INDIANA.

SPEED CHANGE AND REVERSE GEARING.

Application filed March 5, 1923. Serial No. 622,975.

*To all whom it may concern:*

Be it known that I, WILLIAM W. PECK, a citizen of the United States, residing at Muncie, in the county of Delaware and State of Indiana, have invented new and useful Improvements in Speed Change and Reverse Gearing, of which the following is a specification.

This invention relates to the transmission of automobiles and the like and has for its object the provision of a novel gearing system having three speeds forward and a reverse drive, the distinctive features being that there are no operating gears in mesh when the direct drive is being used, no operating gears in mesh when in neutral position, no constantly meshing operating gears, and no idle gears at any point even for providing the reverse drive.

Another object is the provision of gearing of this character in which the arrangement is such that practically all noise will be eliminated especially during the direct drive or neutral position, the noise being however greatly reduced at every point in view of the elimination of idle gears and the reduction in the number of gears necessary to carry out the desired operations.

Another object is the provision of a transmission of this character which will be less expensive to manufacture than the conventional type, owing to the reduction in the number of gears, which will be lighter in weight for the same reason and which is capable of being enclosed within a shorter housing or gear box than is required under ordinary circumstances.

With the above and other objects and advantages in view the invention consists in the details of construction to be hereinafter more fully described and claimed and illustrated in the accompanying drawings, in which:

Referring more particularly to the drawings the letter G represents the main shaft which is rotated by whatever motor or power device is provided and H represents the shaft to be driven. In carrying out the invention I provide stationary shafts J and K parallel with the shafts G and H and disposed to one side thereof. Rotatable on the shaft K is a gear unit consisting of a gear C of relatively large diameter and a gear D of smaller diameter. Slidable and rotatable on the shaft J is a gear unit consisting of integrally formed or rigidly secured gears A and B. Splined upon the shafts G and H, are gears E and F respectively, the former of which is here illustrated as having a grooved collar formed thereon for the purpose of effecting shifting, though it should of course be understood that some means must be provided in association with the units formed by the gears C and D and A and B whereby they likewise may be shifted. The shifting means is not illustrated as it is believed to be a non-essential part of the invention. The parts are of course mounted within a suitable housing or casing, not shown, and the various shafts must naturally be provided with suitable bearings, but these likewise are not illustrated.

Figure 1:
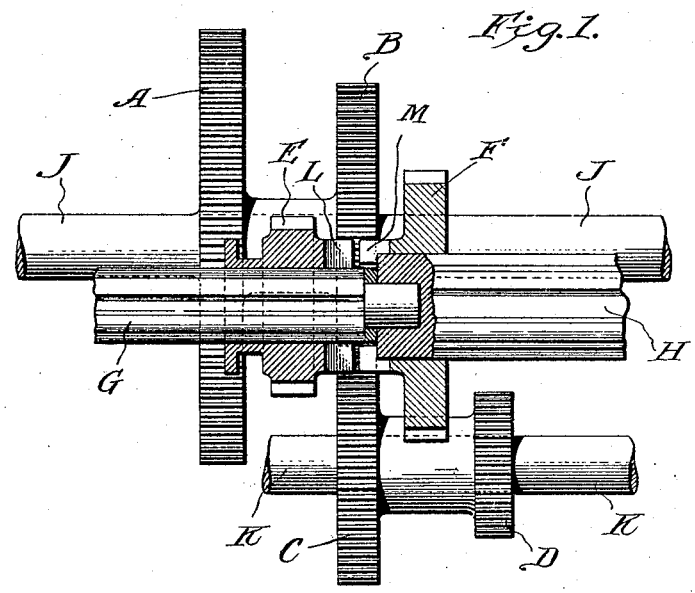
Figure 1 is a longitudinal section showing my gearing.
Figure 2:
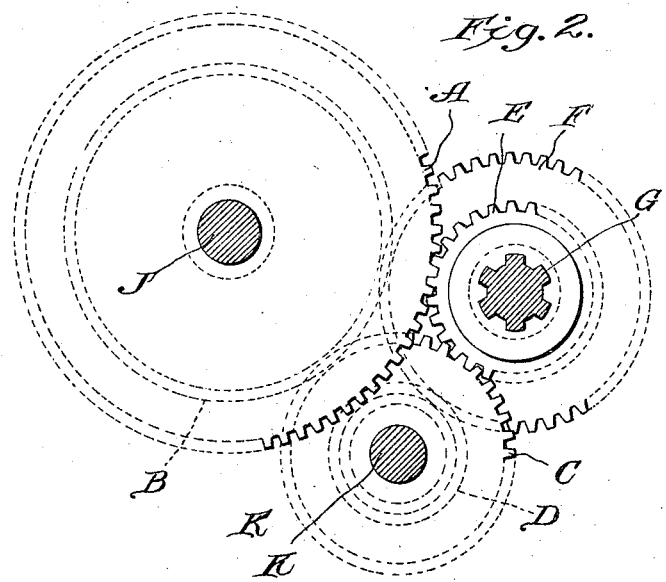
Figure 2 is a cross section.

Assuming that the gears are in the neutral position shown in Figure 1, in order to obtain the first speed, it is necessary to slide the unit consisting of the gears C and D toward the left on shaft K until the gears C and D mesh with the gears E and F respectively. To obtain the second speed, the unit consisting of the gears A and B is slid toward the right on the shaft J until these gears A and B mesh with the gears E and F respectively. It is of course obvious that other speeds might be obtained by spacing other units around the gears E and F at proper centers. To effect the direct drive, it is necessary to slide the gear E to the right on shaft G and the gear F to the left on shaft H until the clutch faces L and M on these gears respectively inter-engage. This operation connects the shafts G and H as one unit and the drive is therefore straight through without any gear reduction.

As disclosed in Figure 1 the gearing is in neutral or inoperative position when the units are in such a position that the gears B and C are in mesh. At such a time both units are stationary and the shaft G turns without producing any effect whatever on the units or on the shaft H.

To drive in reverse, it is necessary to slide the gear E toward the left on shaft G and the gear F toward the right on shaft H until they mesh with the gears A and D respectively. When the gears are in this position it will be observed that when the gear E is rotated in a clockwise direction, the gears A and B will be rotated in a counterclockwise direction, which in turn will revolve the gears C and D clockwise, and gear F and shaft H consequently counter-clockwise. In the case of sliding the one unit, gear C should mesh with the gear E slightly before the gear D meshes with the gear F. In the case of sliding the other unit, the gear A should mesh with the gear E slightly before gear B meshes with gear F. In the case of reverse speed, the gear E should mesh with the gear A slightly before the gear F meshes with the gear D. All these points are a matter of spacing of the respective gears and the idea and purpose of this feature is to start the units revolving before picking up the other gear which is at rest.

From the foregoing description and a study of the drawings it will be apparent that I have thus provided a simply constructed and consequently inexpensive gearing arrangement which possesses many advantages, one of which is the elimination of noise in the gears when in direct drive and in neutral. This is especially commendable in automobile transmissions for instance when the motor is idling. The second advantage is that there is a partial elimination of noise when driving in either of the forward reduced speeds, as it is to be noted that there are merely two sets of gears in mesh as compared with three sets in the well known conventional type of transmission. Another feature of advantage is the elimination of all idler gears and a consequent reduction in the number of gears required for carrying out the operation, this feature economizing in manufacture and saving in weight together with making it possible to enclose the gearing in a housing of less length than is ordinarily needed. The elimination of any gears in mesh while the direct drive or neutral position is maintained is beneficial when testing the transmission for knocks and the like as there is nothing to produce conflicting sounds which may lead the tester to a wrong conclusion.

While I have shown and described the preferred embodiment of the invention it is of course to be understood that I reserve the right to make such changes in the form, construction and arrangement of parts as will not depart from the spirit of the invention of the scope of the subjoined claims.

Having thus described my invention I claim:

1. In a transmission, a drive shaft, a driven shaft arranged in alignment therewith, gears splined upon the meeting ends of said shafts and having their confronting faces formed with clutch members, stationary shafts located parallel with and at one side of said first named shafts, a unit consisting of two gears slidable and rotatable upon one of said stationary shafts, and a unit of two gears slidable and rotatable on the other stationary shaft.

2. In a transmission, a drive shaft, a driven shaft arranged in alignment therewith, gears splined upon the meeting ends of said shafts and having their confronting faces formed with clutch members, stationary shafts located parallel with and at one side of said first named shafts, a unit consisting of two gears slidable and rotatable upon one of said stationary shafts, and a unit of two gears slidable and rotatable on the other stationary shaft, said first named gears being slidable toward each other whereby to engage the clutch faces thereon for effecting a direct coupling between the drive and driven shafts, and being also slidable away from each other to effect reversal.

3. In a transmission, a drive shaft, a driven shaft arranged in alignment therewith, gears splined upon the meeting ends of said shafts and having their confronting faces formed with clutch members, stationary shafts located parallel with and at one side of said first named shafts, a unit consisting of two gears slidable and rotatable upon one of said stationary shafts, and a unit of two gears slidable and rotatable on the other stationary shaft, said first named gears being slidable toward each other whereby to engage the clutch faces thereon for effecting a direct coupling between the drive and driven shafts, and both of said units being selectively slidable whereby to engage the gears thereof with the gears of the other unit or with the gears on the drive and driven shafts.

WILLIAM W. PECK.